(12) United States Patent
Eckart et al.

(10) Patent No.: US 6,693,959 B1
(45) Date of Patent: Feb. 17, 2004

(54) METHOD AND APPARATUS FOR INDEXING AND LOCATING KEY FRAMES IN STREAMING AND VARIABLE-FRAME-LENGTH DATA

(75) Inventors: Stefan Eckart, Mountain View, CA (US); Fabio Ingrao, San Francisco, CA (US); Richard W. Webb, Cupertino, CA (US); Xiaohua Yang, San Jose, CA (US); Michael Lightstone, Fremont, CA (US)

(73) Assignee: ATI International Srl, Christchurch (BB)

( * ) Notice: Subject to any disclaimer, the term of this patent is extended or adjusted under 35 U.S.C. 154(b) by 0 days.

(21) Appl. No.: 09/518,035

(22) Filed: Mar. 3, 2000

(51) Int. Cl.[7] .............................. H04B 1/66; G06K 9/54; H04N 5/91; G09G 5/00
(52) U.S. Cl. .................... 375/240.01; 382/305; 386/69; 345/723
(58) Field of Search ..................... 375/240.01, 240.13; 348/700, 589; 345/418, 723; 382/305, 306; 386/6, 68, 67, 69, 52, 109, 111, 112, 110

(56) References Cited

U.S. PATENT DOCUMENTS

| | | | | |
|---|---|---|---|---|
| 5,768,447 A | * | 6/1998 | Irani et al. | 382/305 |
| 5,828,809 A | * | 10/1998 | Chang et al. | 386/69 |
| 6,157,771 A | * | 12/2000 | Brewer et al. | 386/69 |
| 6,222,532 B1 | * | 4/2001 | Ceccarelli | 345/723 |
| 6,337,683 B1 | * | 1/2002 | Gilbert et al. | 345/418 |

FOREIGN PATENT DOCUMENTS

FR  1 133 180 A2 * 12/2001 ......... H04N 5/783

* cited by examiner

Primary Examiner—Gims Philippe
(74) Attorney, Agent, or Firm—Vedder, Price, Kaufman & Kammholz, P.C.

(57) ABSTRACT

A method and apparatus for indexing and locating key frames in streaming frame data and variable-frame-length data is described. Fast and efficient location of desired key frames in both directions (e.g., forward/backward, future/past) is provided. An estimate of the distance to the desired key frame is made and a seek performed according to that distance. At the location specified by the seek, key frame seek assist data are obtained. The desired key frame is located or a new seek is performed, depending on the key frame seek assist data obtained. By placing the key frame seek assist data at readily identifiable locations, efficient location of key frames is provided. The key frame seek assist data may be tailored to optimize efficiency for seeking in a particular direction, for example, backwards. The seek process is correspondingly configured to favor seeking in the more efficient direction.

41 Claims, 4 Drawing Sheets

METHOD AND APPARATUS FOR INDEXING AND LOCATING KEY FRAMES IN STREAMING AND VARIABLE-FRAME-LENGTH DATA

TECHNICAL FIELD OF THE INVENTION

The invention relates generally to indexing and locating data and more specifically to indexing and locating key frames in variable-frame-length data.

BACKGROUND OF THE INVENTION

Multimedia data is often stored in formats that reduce memory and bandwidth requirements. For example, video data is typically organized in frames. A frame provides an image which, when displayed in sequence with other images, gives the video data the ability to portray motion. While frames of video data could be stored and transmitted as frames of fixed length with each frame including all data needed to display that frame, such an approach tends to be inefficient and increases memory and bandwidth requirements.

Since images are often quite similar from frame-to-frame, video data from one frame, referred to as a key frame, may be utilized to reduce the amount of video data that needs to be stored and transmitted to display nearby frames. While the key frame includes sufficient video data to display the image it represents without reference to other frames, the nearby frames may contain much less video data since that video data may be combined with the video data of the key frame to display the nearby frames. Since the key frames and the nearby frames (non-key-frames) contain varying amounts of video data, the frames vary in length. A video format, for example, a Moving Picture Experts Group (MPEG) video format, is thus considered to be a variable-frame-length data format.

Variable-frame-length data formats may be advantageous in that minimal necessary frame lengths may be used. However, variable-frame-length data, by definition, results in loss of predictability of frame-to-frame distances. While this is not problematic when frames are being processed in consecutive sequence in their normal direction (e.g. forward), the lack of predictability can cause errors and complication when attempting to process the frames in a non-consecutive sequence or in a reverse direction. For example, providing fast forward and rewind functions usually involves playing back a frame, skipping several frames, playing back another frame, skipping more frames, and so on.

To obtain minimal necessary frame lengths in the variable-frame-length data, some frames (e.g., non-key-frames) are expressed with reference to other frames (e.g., key frames). The key frames are frames that contain sufficient information to be presented without reference to other frames. While key frames needed to interpret non-key frames may be readily available when frames are processed in a consecutive sequence in their normal direction (e.g., during normal playback), interpreting the non-key frames would not be possible if the key frames were skipped over during fast forward or rewind functions. Thus, fast forward and rewind functions usually rely on playback of selected key frames, skipping over all non-key-frames.

Techniques have been developed to index frames and aid in locating frames. However, these techniques usually require information about the entire sequence of frames being indexed before the indexing may be performed. This requirement is not satisfactory for processing streaming data, where information about subsequently occurring frames in the stream is not known until the occurrence of those subsequently occurring frames. Thus, using such existing techniques, indexing of the stream would have to be suspended until the entire stream has been received. Also, sufficient memory resources to process the entire stream would be required.

Also, existing techniques associate indexing information only with certain frames, such as key frames, not with other frames, such as non-key-frames. Thus, use of the indexing information may be made only after a key frame has been located, not at any arbitrary frame in the sequence.

Thus, a method and apparatus is needed that allows indexing and locating key frames in streaming and variable-frame-length data. Furthermore, a technique is needed that allows location of desired key frames from any arbitrary frame in a sequence.

DETAILED DESCRIPTION OF A PREFERRED EMBODIMENT

A method and apparatus for indexing and locating key frames in streaming frame data and variable-frame-length data is described. Fast and efficient location of desired key frames in both directions (e.g., forward/backward, future/past) is provided. An estimate of the distance to the desired key frame is made and a seek performed according to that distance. At the location specified by the seek, key frame seek assist data are obtained. The desired key frame is located or a new seek is performed, depending on the key frame seek assist data obtained. By placing the key frame seek assist data at readily identifiable locations, efficient location of key frames is provided. The key frame seek assist data may be tailored to optimize efficiency for seeking in a particular direction, for example, backwards. The seek process is correspondingly configured to favor seeking in the more efficient direction.

Figure 1:
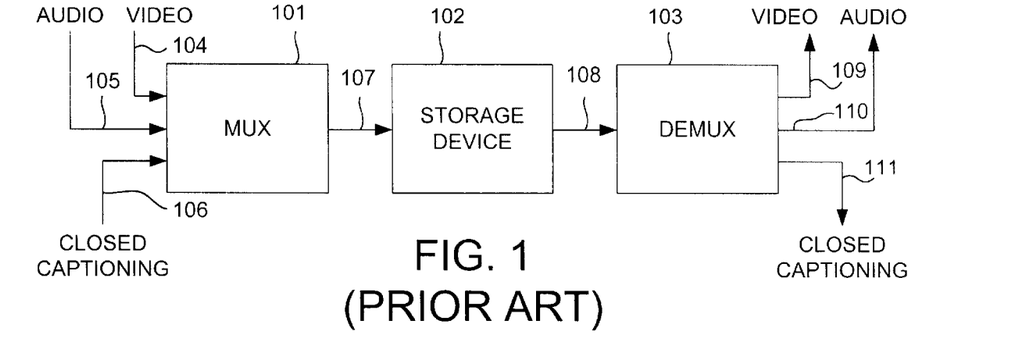
FIG. 1 is a block diagram illustrating a multiplexing and demultiplexing system of the prior art.

FIG. 1 is a block diagram illustrating a multiplexing and demultiplexing system of the prior art. The multiplexing and demultiplexing system comprises multiplexer 101, storage device 102, and demultiplexer 103. Video 104, audio 105, and closed captioning 106 are multiplexed by multiplexer 101 to provide multiplexed data 107. Multiplexed data 107 are recorded on storage device 102. Multiplexed data 108 are read from storage device 102 and provided to demultiplexer 103. Demultiplexer 103 demultiplexes multiplexed data 108 into video 109, audio 110, and closed captioning 111. While such a system allows recording and playback of video, audio, and closed captioning information, it does not readily facilitate functions such as fast forward or rewind (i.e., playing back the video, audio, and closed captioning information at different rates or in a reversed sequence). Since modem data compression techniques often store multimedia data in variable-frame-length frames, locating appropriate non-adjacent frames for functions such as fast forward and rewind can be complicated, consuming much time and computational resources.

Figure 2:
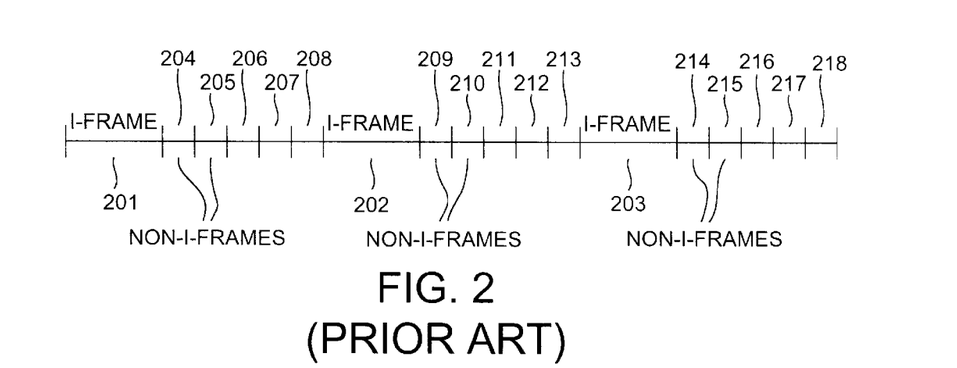
FIG. 2 is a linear diagram illustrating a sequence of variable-frame-length data according to the prior art.

FIG. 2 is a linear diagram illustrating a sequence of variable-frame-length data according to the prior art. In a modem compressed format, for example, a Moving Picture Experts Group (MPEG) format, images are stored using several types of frames. These may include I-frames (or "intra" frames), B-frames, and P-frames. I-frames contain sufficient information to reconstruct the image represented by the I-frame without the need to refer to other frames. Thus, I-frames are an example of key frames in the context of an MPEG format. However, other types of frames provide information about images with reference to I-frames. Thus, to reconstruct the images of these other types of frames, information for a corresponding I-frame must first be obtained.

The sequence of variable-frame-length data illustrated in FIG. 2 includes I-frames 201, 202, and 203, as well as non-I-frames 204, 205, 206, 207, 208, 209, 210, 211, 212, 213, 214, 215, 216, 217, and 218. Non-I-frames 204, 205, 206, 207, and 208 follow I-frame 201. I-frame 201 is the corresponding I-frame referenced by non-I-frames 204, 205, 206, 207, and 208. Non-I-frames 209, 210, 211, 212, and 213 follow I-frame 202. I-frame 202 is the corresponding I-frame referenced by non-I-frames 209, 210, 211, 212, and 213. Non-I-frames 214, 215, 216, 217, and 218 follow I-frame 203. I-frame 203 is the corresponding I-frame referenced by non-I-frames 214, 215, 216, 217, and 218.

Figure 3:
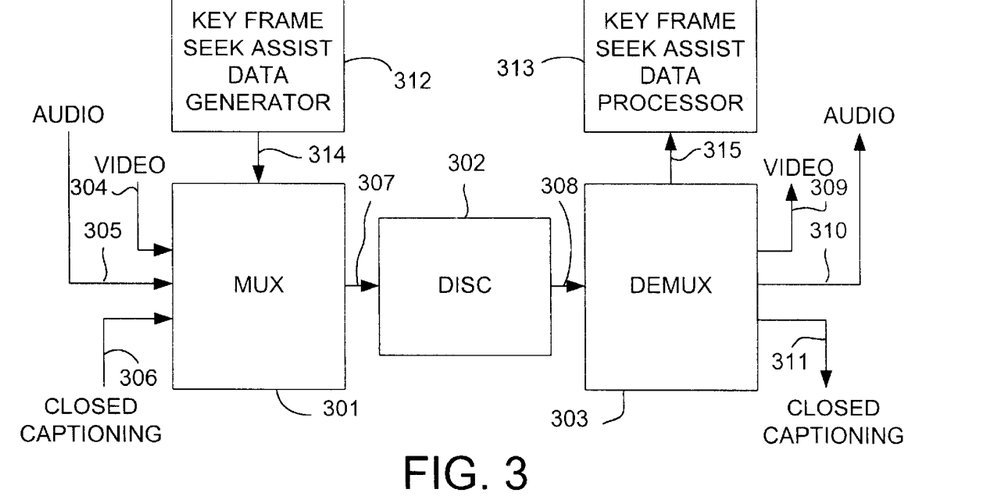
FIG. 3 is a block diagram illustrating a multiplexing and demultiplexing system in accordance with an embodiment of the invention.

FIG. 3 is a block diagram illustrating a multiplexing and demultiplexing system in accordance with an embodiment of the invention. The system includes multiplexer 301, storage device 302, demultiplexer 303, key frame seek assist data generator 312, and key frame seek assist data processor 313. Key frame seek assist data generator 312 is coupled to multiplexer 301 and provides key frame seek assist data 314 to multiplexer 301. Multiplexer 301 also receives video 304, audio 305, and closed captioning 306.

Multiplexer 301 multiplexes the key frame seek assist data 314 together with the video 304, audio 305, and closed captioning 306 to provide multiplexed data stream 307. Multiplexed data stream 307 may be recorded on storage device 302 or otherwise transmitted. Storage device 302 may, for example, be a disk drive or other device capable of storing information. Multiplexed data stream 308 may be received from storage device 302 and provided to demultiplexer 303. Demultiplexer 303 demultiplexes multiplexed data stream 308 to provide video 309, audio 310, closed captioning 311, and key frame seek assist data 315. Demultiplexer 303 provides key frame seek assist data 315 to key frame seek assist data processor 313.

In one embodiment of this apparatus, a key frame seek assist data generator is operatively coupled to the multiplexer to generate key frame seek assist data based only on a preceding portion of the streaming frame data. The apparatus may be implemented in a system that includes a central processing unit (CPU) and memory. The memory may be used to store multiplexer program code, with the CPU processing the multiplexer program code to implement the multiplexer. The memory may further store key frame seek assist data generator program code, with the CPU further processing the key frame seek assist data generator program code to implement the key frame seek assist data generator.

Figure 4:
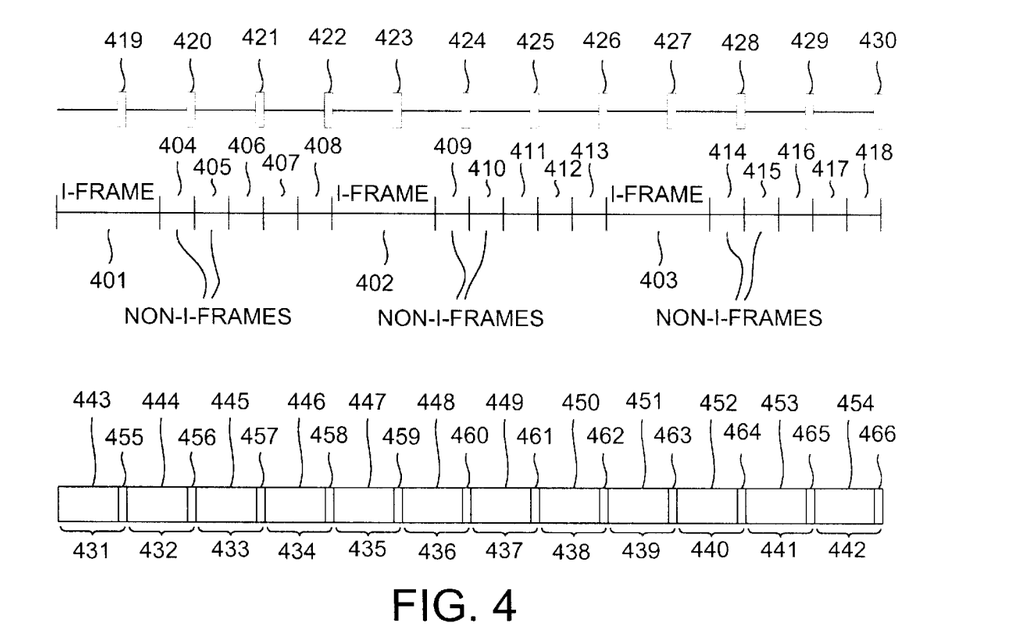
FIG. 4 is a linear diagram illustrating packed variable-frame-length data including key frame seek assist data in accordance with an embodiment of the invention.

FIG. 4 is a linear diagram illustrating packed variable-frame-length data including key frame seek assist data in accordance with an embodiment of the invention. The sequence of variable-frame-length data illustrated in FIG. 4 includes I-frames 401, 402, and 403, as well as non-I-frames 404, 405, 406, 407, 408, 409, 410, 411, 412, 413, 414, 415, 416, 417, and 418. Non-I-frames 404, 405, 406, 407, and 408 follow I-frame 401. I-frame 401 is the corresponding I-frame referenced by non-I-frames 404, 405, 406, 407, and 408. Non-I-frames 409, 410, 411, 412, and 413 follow I-frame 402. I-frame 402 is the corresponding I-frame referenced by non-I-frames 409, 410, 411, 412, and 413. Non-I-frames 414, 415, 416, 417, and 418 follow I-frame 403. I-frame 403 is the corresponding I-frame referenced by non-I-frames 414, 415, 416, 417, and 418. This sequence of variable-frame-length data is multiplexed with key frame seek assist data.

The key frame seek assist data is provided throughout the variable-frame-length data, preferably at regular intervals. The sequence of key frame seek assist data includes key frame seek assist data 419, 420, 421, 422, 423, 424, 425, 426, 427, 428, 429, and 430.

The stream of multiplexed data is transmitted as "packed" data. While the variable-frame-length data may include frames of varying length, the data is "packed" into "packs" of preferably regular size, for example, 2 Kbytes. The "packed" data stream includes packs 431, 432, 433, 434, 435, 436, 437, 438, 439, 440, 441, and 442. Each pack includes external data, such as video (including I-frames and non-I-frames), audio, and closed captioning.

Pack 431 includes external data 443 and key frame seek assist data 455. Pack 432 includes external data 444 and key frame seek assist data 456. Pack 433 includes external data 445 and key frame seek assist data 457. Pack 434 includes external data 446 and key frame seek assist data 458. Pack 435 includes external data 447 and key frame seek assist data 459. Pack 436 includes external data 448 and key frame seek assist data 460. Pack 437 includes external data 449 and key frame seek assist data 461. Pack 438 includes external data 450 and key frame seek assist data 462. Pack 439 includes external data 451 and key frame seek assist data 463. Pack 440 includes external data 452 and key frame seek assist data 464. Pack 441 includes external data 453 and key frame seek assist data 465. Pack 442 includes external data 454 and key frame seek assist data 466.

Figure 5:
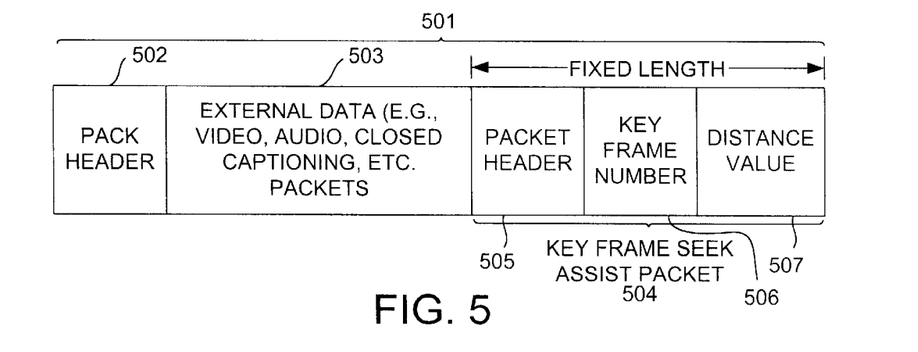
FIG. 5 is a linear diagram illustrating a pack of data including key frame seek assist data in accordance with an embodiment of the invention.

FIG. 5 is a linear diagram illustrating a pack of data including key frame seek assist data in accordance with an embodiment of the invention. The pack 501 of data includes a pack header 502, external data 503, and a key frame seek assist packet 504. The external data 503 may include video, audio, closed captioning, and/or other types of multimedia data. The key frame seek assist packet 504 may include a packet header 505, a key frame number 506, and a distance value 507. The packet header 505 serves to identify the key frame seek assist packet 504 in a manner compliant with the standards for the data format. For example, if the data is being transmitted in an MPEG format, the packet header 505 is selected to be compatible with the MPEG format. The packet header 505 identifies the key frame seek assist packet 504 as being related to the external data 503, but identifies the key frame seek assist packet 504 as being different from the external data 503. Thus, the key frame seek assist packet 504 is disregarded by programs and systems designed to use external data 503, but not designed to utilize key frame seek assist packet 504.

Key frame number 506 denotes a number or other symbol used to uniquely identify the key frame corresponding to the external data 503. Thus, without obtaining key frame data, a program or system using external data 503 may identify the key frame corresponding to external data 503. Distance value 507 indicates a distance to the key frame from the current location. For example, the distance may be expressed in bytes, bits, sectors, multiples thereof, or other units representative of the spatial relationship between the key frame and the current location Thus, even though the data may be variable-frame-length data, the distance to the key frame may be readily determined by reading the distance value 507. The key frame seek assist packet 504 preferably has a fixed length.

Figure 6:
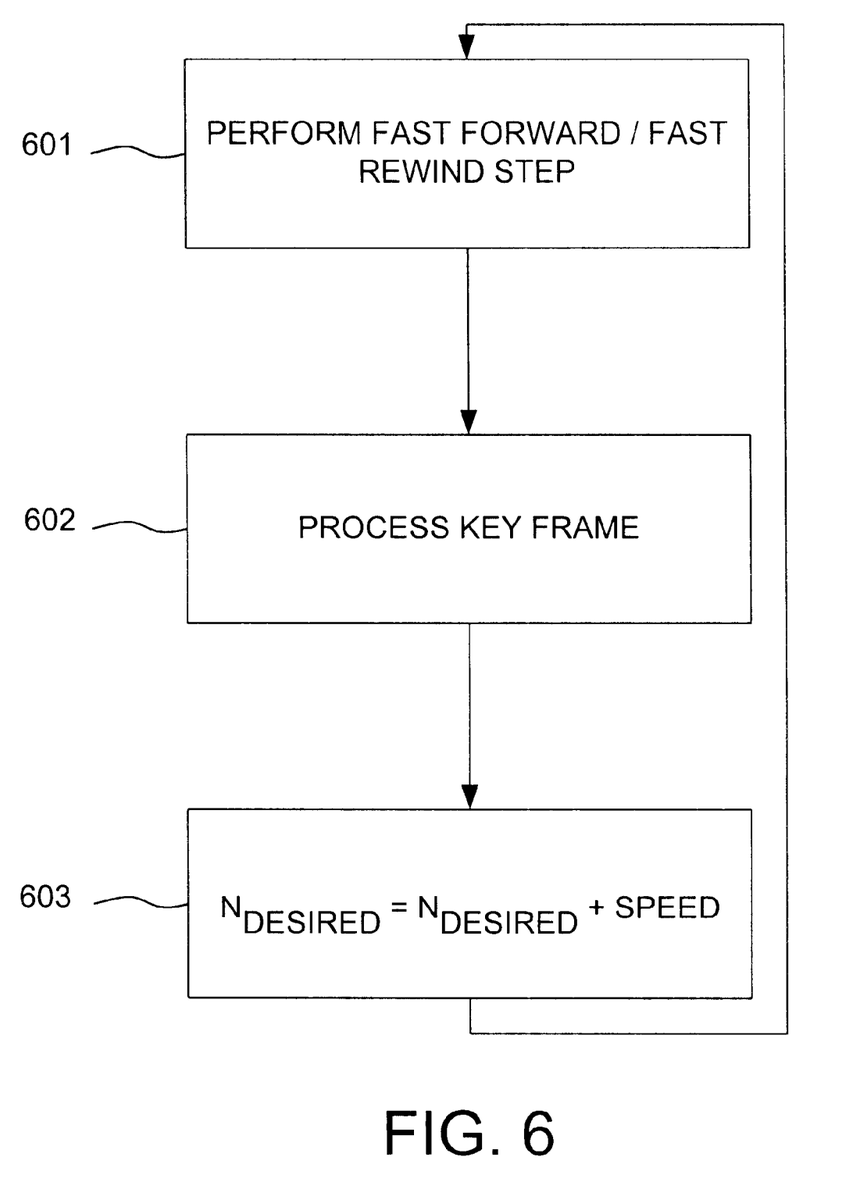
FIG. 6. is a block diagram illustrating a process in accordance with an embodiment of the invention.

FIG. 6. is a block diagram illustrating a process in accordance with an embodiment of the invention. The process includes step 601, where a fast forward/fast rewind step is performed. This step is initialized by setting a key frame number parameter $N_{DESIRED}$. In this step, a key frame located several frames ahead or behind the previous key frame is located. In step 602, the key frame is processed. This processing may include any steps needed to display the key frame. In step 603, a next key frame is designated by adding a speed parameter to the key frame number parameter $N_{DESIRED}$. From step 603, the process returns to step 601 to perform the fast forward/fast rewind step using the next key frame.

Figure 7:
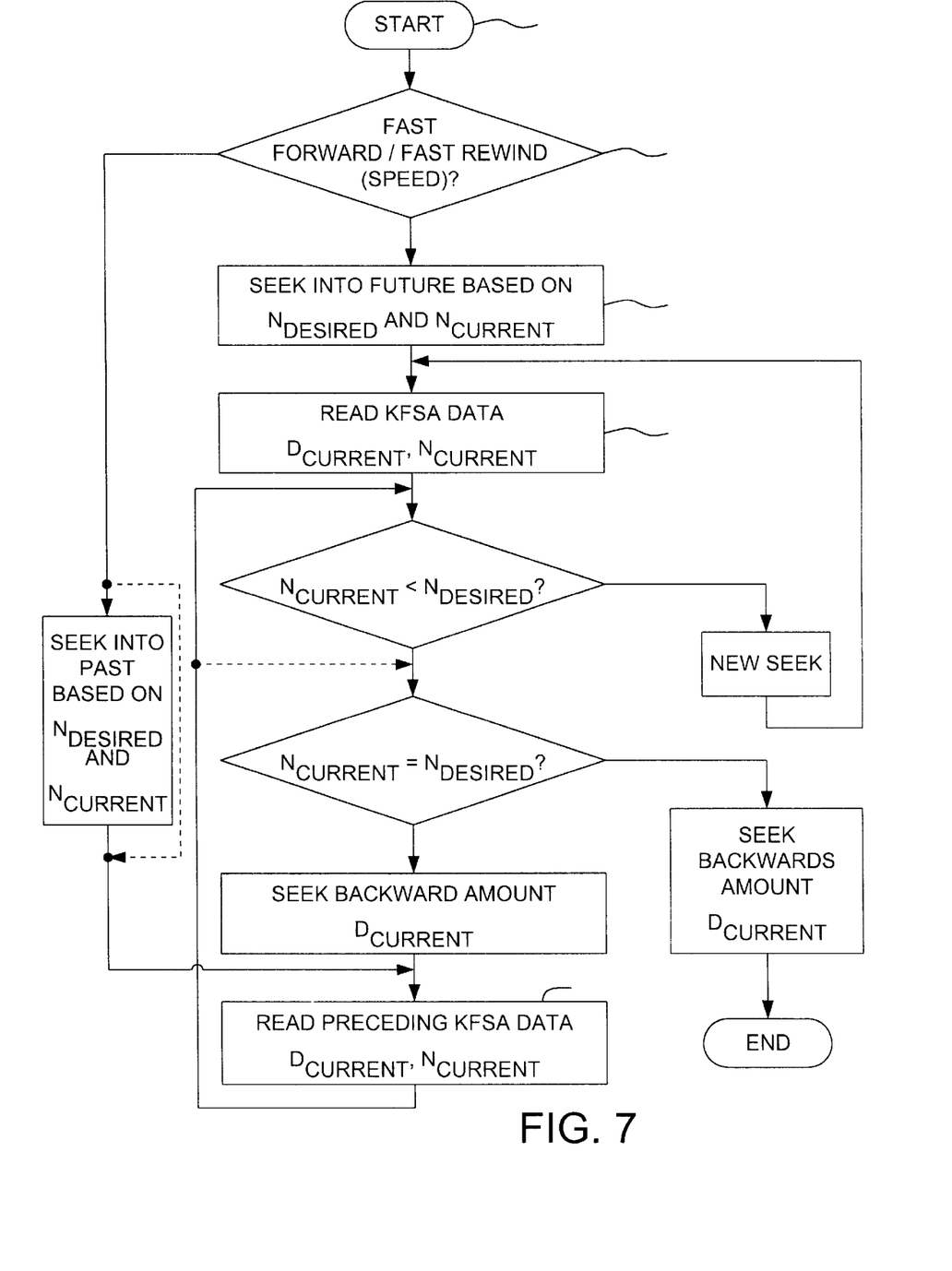
FIG. 7 is a block diagram illustrating a process in accordance with an embodiment of the invention.

FIG. 7 is a block diagram illustrating a process in accordance with an embodiment of the invention. The process begins in step 701 and continues to step 702. In step 702, a decision is made as to whether fast forward or fast rewind is desired. If the fast forward function is desired, the process continues to step 703. In step 703, a seek into the future is made based on key frame number parameters $N_{DESIRED}$ and $N_{CURRENT}$. The seek involves changing a current position in the data to a new current position. A seek into the future involves changing to a position ahead of the current position with respect to the direction in which the data is normally utilized. If a sequence of monotonically increasing numbers is used as key frame numbers, seek into the future may be performed by changing the position in the direction of higher key frame numbers.

$N_{DESIRED}$ denotes the next desired key frame number, and $N_{CURRENT}$ denotes the current key frame. Since the data over which the seek occurs may be variable-frame-length data, and the number of frames covered in a given seek is difficult to predict, an estimate is made as to the distance of the seek. Any inaccuracies in the estimate are accommodated by other steps in the process. The seek occurs into the future in that seek occurs over a stream of data that is typically processed over time as a sequence of frames. Frames later in the sequence relative to a current location are viewed as occurring in the future, while frames earlier in the sequence relative to the current location are viewed as occurring in the past.

In step 704, key frame seek assist (KFSA) data $D_{CURRENT}$ and $N_{CURRENT}$ are read. $N_{CURRENT}$ uniquely identifies the key frame corresponding to the current location, and $D_{CURRENT}$ denotes the distance from the current location to the key frame corresponding to the current location. In step 705, a decision is made as to whether $N_{CURRENT} < N_{DESIRED}$. If so, the process continues to step 710. In step 710, a new seek is performed. The new seek is made using a value for $N_{CURRENT}$ that is farther into the future to attempt to prevent the new $N_{CURRENT}$ from being less than $N_{DESIRED}$. From step 710, the process returns to step 704 with the new value of $N_{CURRENT}$.

If, in step 705, $N_{CURRENT}$ is not less than $N_{DESIRED}$, the process continues to step 706. In step 706, a decision is made as to whether or not $N_{CURRENT} = N_{DESIRED}$. If so, the process continues to step 711. In step 711, a seek backwards (i.e., into the past) a distance of $D_{CURRENT}$ is performed to obtain the desired key frame. Since $D_{CURRENT}$ denotes the distance from the current location to the key frame corresponding to the current location, and since the fact that $N_{CURRENT} = N_{DESIRED}$ denotes that the current key frame is the desired key frame, seeking backward a distance $D_{CURRENT}$ assures that the seek will land precisely on the desired key frame. Thus, the desired key frame is obtained, and the process ends in step 712.

If, in step 706, $N_{CURRENT}$ is not equal to $N_{DESIRED}$, a seek backward (i.e., into the past) by a distance of $D_{CURRENT}$ is performed in step 707. In step 708, the KFSA data that immediately precedes the location reached by the seek of step 707 is obtained and used as a new $D_{CURRENT}$ and $N_{CURRENT}$. From step 708, the process returns to step 705 using the new values for $D_{CURRENT}$ and $N_{CURRENT}$.

If, in step 702, it was determined that a fast rewind function (SPEED<0) is desired, the process continues to step 709. In step 709, a seek backward (i.e., into the past) is performed based on $N_{CURRENT}$ and $N_{DESIRED}$. Based on the relative values of $N_{CURRENT}$ and $N_{DESIRED}$, the distance into the past is estimated. In the event that the estimate is inaccurate, other steps in the process compensate for the inaccuracy. From step 709, the process continues to step 708.

Step 709 is optional and may be omitted. In the event that step 709 is omitted from the process, the process may continue from step 708 to step 706, bypassing step 705 as it would otherwise occur following step 708.

The invention may be applied to streaming frame data occurring over time, where past frame data is known, but future frame data is unknown. A method for indexing key frames in streaming frame data may be performed by generating key frame seek assist data based on the location of past key frames and periodically inserting the key frame seek assist data into the streaming frame data. A key frame number to uniquely identify each of the key frames is generated. A distance value based on the distance to a corresponding key frame is also generated.

A method for indexing key frames in variable-frame-length data may be performed by generating key frame seek assist data based on the location of the key frames and periodically inserting the key frame seek assist data into the variable-frame-length data at a frequency greater than the frequency of the key frames. A key frame number and a distance value are generated.

A method for locating key frames in variable-frame-length data may be performed by computing an first estimated location of a desired key frame, obtaining key frame seek assist data at the first estimated location, and using the key frame seek assist data to obtain the exact location of the desired key frame. The key frame seek assist data may be obtained from a non-key frame. The computation of the first estimated location of the desired key frame may be based on various parameters, for example, a bit rate (which may be an average number of bytes per frame or a number of bytes per time), a frame frequency (which may be a number of frames per second), a temporal key frame distance, a non-key-frame-to-key-frame ratio, a bit rate variability constraint, etc. These parameters need not be mutually exclusive. For example, a non-key-frame-to-key-frame ratio may be considered to imply a temporal key frame distance.

Obtaining key frame seek assist data may include obtaining a most recent key frame number that uniquely identifies a most recent key frame. It may also include obtaining a distance value representative of a distance to the most recent key frame. A comparison is made between the most recent key frame number and a desired key frame number of the desired key frame. When the most recent key frame number is greater than the desired key frame number, the most recent key frame is located based on the distance value, and new key frame seek assist data that precedes the most recent key frame are obtained. When the most recent key frame number is less than the desired key frame number, a new estimated location of the desired key frame is computed, new key frame seek assist data are obtained at the new estimated location, and the new key frame seek assist data are used to obtain the exact location of the desired key frame. The new estimated location is computed such that the first estimated location precedes the new estimated location.

A method for locating a desired key frame preceding a current non-key-frame location in variable-frame-length data may be performed by obtaining key frame seek assist data from the current non-key-frame location and using the new key frame seek assist data to obtain an exact location of the desired key frame. The key frame seek assist data includes a most recent key frame number that uniquely identifies a most recent key frame and a distance value representative of a distance to the most recent key frame. The most recent key frame number is compared with a desired key frame number of the desired key frame. When the most recent key frame number is greater than the desired key frame number, the most recent key frame is located based on the distance value and new key frame seek assist data that precedes the most recent key frame are obtained.

The invention may be practiced using a program storage device readable by a machine, tangibly embodying a program of instructions executable by the machine to perform the method steps described above. The machine may be a general purpose computer system or a component thereof. Alternatively, the machine may be specifically dedicated to performing the method steps described above.

Accordingly, a method and apparatus for indexing and locating key frames in streaming and variable-frame-length data has been described. It should be understood that the implementation of other variations and modifications of the invention in its various aspects will be apparent to those of ordinary skill in the art, and that the invention is not limited by the specific embodiments described. It is therefore contemplated to cover by the present invention, any and all modifications, variations, or equivalents that fall within the spirit and scope of the basic underlying principles disclosed and claimed herein.

What is claimed is:

1. A method for indexing key frames in streaming frame data comprising the steps of:
    generating key frame seek assist data based on the location of past key frames;
    periodically inserting the key frame seek assist data into the streaming frame data;
    wherein generating the key frame seek assist data further comprises the step of:
        generating a key frame number to uniquely identify each of the key frames; and
    generating the key frame seek assist data further comprises the step of:
        generating a distance value based on the distance to a corresponding key frame.

2. A method for indexing key frames in variable-frame-length data comprising the steps of:
    generating key frame seek assist data based on the location of the key frames;
    periodically inserting the key frame seek assist data into the variable-frame-length data at a frequency greater than the frequency of the key frames.

3. The method of claim 2 wherein the step of generating the key frame seek assist data further comprises the step of:
    generating a key frame number to uniquely identify each of the key frames.

4. The method of claim 3 wherein the step of generating the key frame seek assist data further comprises the step of:
    generating a distance value based on the distance to a corresponding key frame.

5. A method for locating a desired key frame in variable-frame-length data comprising the steps of:
    computing an first estimated location of the desired key frame;
    obtaining key frame seek assist data at the first estimated location;
    using the key frame seek assist data to obtain the exact location of the desired key frame.

6. The method of claim 5 wherein the step of obtaining key frame seek assist data further comprises the step of:
    obtaining key frame seek assist data from a non-key frame.

7. The method of claim 5 wherein the step of computing the first estimated location further comprises the step of:
    computing the first estimated location based on parameters selected from a group consisting of:
        bit rate,
        frame frequency,
        temporal key frame distance,
        a non-key-frame-to-key-frame ratio, and
        a bit rate variability constraint.

8. The method of claim 5 wherein the step of obtaining key frame seek assist data further comprises the step of:
    obtaining a most recent key frame number that uniquely identifies a most recent key frame.

9. The method of claim 8 wherein the step of obtaining key frame seek assist data further comprises the step of:
    obtaining a distance value representative of a distance to the most recent key frame.

10. The method of claim 8 further comprising the step of:
    comparing the most recent key frame number with a desired key frame number of the desired key frame.

11. The method of claim 10 wherein the step of using the key frame seek assist data to obtain the exact location of the desired key frame further comprises the step of:
    when the most recent key frame number is greater than the desired key frame number, locating the most recent key frame based on the distance value; and
    obtaining new key frame seek assist data that precedes the most recent key frame.

12. The method of claim 10 wherein the step of using the key frame seek assist data to obtain the exact location of the desired key frame further comprises the steps of:
    when the most recent key frame number is less than the desired key frame number, computing a new estimated location of the desired key frame;

obtaining new key frame seek assist data at the new estimated location;

using the new key frame seek assist data to obtain the exact location of the desired key frame.

13. The method of claim 12 wherein the step of computing a new estimated location of the desired key frame further comprises the step of:

computing the new estimated location such that the first estimated location precedes the new estimated location.

14. A method for locating a desired key frame preceding a current non-key-frame location in variable-frame-length data comprising the steps of:

obtaining key frame seek assist data from the current non-key-frame location; and using the key frame seek assist data to obtain an exact location of the desired key frame.

15. The method of claim 14 wherein the step of obtaining key frame seek assist data further comprises the step of:

obtaining a most recent key frame number that uniquely identifies a most recent key frame.

16. The method of claim 15 wherein the step of obtaining key frame seek assist data further comprises the step of:

obtaining a distance value representative of a distance to the most recent key frame.

17. The method of claim 16 further comprising the step of:

comparing the most recent key frame number with a desired key frame number of the desired key frame.

18. The method of claim 17 wherein the step of using the key frame seek assist data to obtain the exact location of the desired key frame further comprises the step of:

when the most recent key frame number is greater than the desired key frame number, locating the most recent key frame based on the distance value; and obtaining new key frame seek assist data that precedes the most recent key frame.

19. Apparatus for indexing key frames in streaming frame data comprising:

a multiplexer; and a key frame seek assist data generator operatively coupled to the multiplexer to generate key frame seek assist data based only on a preceding portion of the streaming frame data, the key frame seek assist data being multiplexed with the streaming frame data by the multiplexer.

20. The apparatus of claim 19 implemented in a system comprising:

a central processing unit (CPU); and a memory, the memory storing multiplexer program code, the CPU processing the multiplexer program code to implement the multiplexer, the memory further storing key frame seek assist data generator program code, the CPU further processing the key frame seek assist data generator program code to implement the key frame seek assist data generator.

21. The apparatus of claim 19 wherein the key frame seek assist data comprises:

a key frame number to uniquely identify a previously occurring key frame; and a distance value based on a distance to the previously occurring key frame, the key frame number and the distance value allowing location of the previously occurring key frame.

22. A program storage device readable by a machine, tangibly embodying a program of instructions executable by the machine to perform a method for indexing key frames in streaming frame data, the method comprising the steps of:

generating key frame seek assist data based on the location of past key frames;

periodically inserting the key frame seek assist data into the streaming frame data.

23. The program storage device of claim 22 wherein the step of generating the key frame seek assist data further comprises the step of:

generating a key frame number to uniquely identify each of the key frames.

24. The program storage device of claim 23 wherein the step of generating the key frame seek assist data further comprises the step of:

generating a distance value based on the distance to a corresponding key frame.

25. A program storage device readable by a machine, tangibly embodying a program of instructions executable by the machine to perform a method for indexing key frames in variable-frame-length data, the method comprising the steps of:

generating key frame seek assist data based on the location of the key frames;

periodically inserting the key frame seek assist data into the variable-frame-length data at a frequency greater than the frequency of the key frames.

26. The program storage device of claim 25 wherein the step of generating the key frame seek assist data further comprises the step of:

generating a key frame number to uniquely identify each of the key frames.

27. The method of claim 26 wherein the step of generating the key frame seek assist data further comprises the step of:

generating a distance value based on the distance to a corresponding key frame.

28. A program storage device readable by a machine, tangibly embodying a program of instructions executable by the machine to perform a method for locating key frames in variable-frame-length data, the method comprising the steps of:

computing an first estimated location of a desired key frame;

obtaining key frame seek assist data at the first estimated location;

using the key frame seek assist data to obtain the exact location of the desired key frame.

29. The program storage device of claim 28 wherein the step of obtaining key frame seek assist data further comprises the step of:

obtaining key frame seek assist data from a non-key frame.

30. The program storage device of claim 28 wherein the step of computing the first estimated location further comprises the step of:

computing the first estimated location based on parameters selected from a group consisting of:
bit rate,
frame frequency,
temporal key frame distance,
a non-key-frame-to-key-frame ratio, and
a bit rate variability constraint.

31. The program storage device of claim 28 wherein the step of obtaining key frame seek assist data further comprises the step of:

obtaining a most recent key frame number that uniquely identifies a most recent key frame.

32. The program storage device of claim 31 wherein the step of obtaining key frame seek assist data further comprises the step of:

obtaining a distance value representative of a distance to the most recent key frame.

33. The program storage device of claim 31 wherein in the method further comprises the step of:

comparing the most recent key frame number with a desired key frame number of the desired key frame.

34. The program storage device of claim 33 wherein the step of using the key frame seek assist data to obtain the exact location of the desired key frame further comprises the step of:

when the most recent key frame number is greater than the desired key frame number, locating the most recent key frame based on the distance value; and obtaining new key frame seek assist data that precedes the most recent key frame.

35. The program storage device of claim 33 wherein the step of using the key frame seek assist data to obtain the exact location of the desired key frame further comprises the step of:

when the most recent key frame number is less than the desired key frame number, computing a new estimated location of the desired key frame;

obtaining new key frame seek assist data at the new estimated location;

using the new key frame seek assist data to obtain the exact location of the desired key frame.

36. The program storage device of claim 35 wherein the step of computing a new estimated location of the desired key frame further comprises the step of:

computing the new estimated location such that the first estimated location precedes the new estimated location.

37. A program storage device readable by a machine, tangibly embodying a program of instructions executable by the machine to perform a method for locating a desired key frame preceding a current non-key-frame location in variable-frame-length data, the method comprising the steps of:

obtaining key frame seek assist data from the current non-key-frame location; and using the new key frame seek assist data to obtain an exact location of the desired key frame.

38. The program storage device of claim 37 wherein the step of obtaining key frame seek assist data further comprises the step of:

obtaining a most recent key frame number that uniquely identifies a most recent key frame.

39. The program storage device of claim 38 wherein the step of obtaining key frame seek assist data further comprises the step of:

obtaining a distance value representative of a distance to the most recent key frame.

40. The program storage device of claim 39 wherein the method further comprises the step of:

comparing the most recent key frame number with a desired key frame number of the desired key frame.

41. The program storage device of claim 40 wherein the step of using the key frame seek assist data to obtain the exact location of the desired key frame further comprises the step of:

when the most recent key frame number is greater than the desired key frame number, locating the most recent key frame based on the distance value; and obtaining new key frame seek assist data that precedes the most recent key frame.

* * * * *